United States Patent Office 3,121,068
Patented Feb. 11, 1964

3,121,068
STABILIZED POLYPROPYLENE COMPOSITION CONTAINING AN A-STAGE PARA-TERTIARY ALKYLPHENOL-FORMALDEHYDE RESIN AND A MONOMERIC ALIPHATIC EPOXIDE
Bernard O. Baum, Plainfield, N.J., assignor to Union Carbide Corporation, a corporation of New York
No Drawing. Filed Jan. 5, 1960, Ser. No. 494
12 Claims. (Cl. 260—43)

This invention relates to improved propylene polymer compositions. More particularly, it relates to polypropylene having greatly increased resistance to light and thermal degradation and being substantially light in color.

Solid polypropylene is recognized in the plastics industry as possessing great commercial potential because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency and their stiffness moduli.

Unfortunately, propylene polymers are subject to severe deterioration from the oxidative action of air at elevated temperatures. For example, fibers that are melt spun from polypropylene and have high initial strengths, 4 to 5 grams per denier, lose about 50 percent of their strength within about 50 hours after being placed in a circulating air oven at 125° C., and tend to disintegrate completely within about 100 hours to a powdery material. The stability of unstabilized crystalline polypropylene to heat aging also varies with the amount of impurities or catalyst residue remaining in the polymer, and in certain cases, the polymer is so unstable that fibers produced therefrom disintegrate wthin 5 to 10 hours at 125° C. This susceptibility of polypropylene to deteriorate under such conditions is much greater than that observed with most other high molecular weight polyolefin resins. This can be seen when one considers that unstabilized polyethylene fibers can withstand 500 hours at 100° C. without serious loss in strength.

While it is known that small amounts of some anti-oxidants, for example, 4,4'-thio-bis(6-tertiarybutyl-3-methylphenol), 2,2-bis(4-hydroxyphenyl)propane, diphenylamine, etc., can be added to polypropylenes to prevent degradative effects during the short period the polymer is heated for melt spinning to produce fibers, it is not possible by the use of these conventional and well known anti-oxidants to prevent the oxidative degradation that occurs over prolonged exposure to air at temperatures below the melting temperature of polypropylene. For example, the inclusion in a polypropylene fiber of two percent by weight of 4,4'-thio-bis(6-tertiarybutyl-3-methylphenol), which is known to be one of the most effective anti-oxidants for polyethylene, increases the time of exposure at 125° C. required to cause 50 percent loss in strength from 50 hours to only about 150 hours. It can be seen that this is still inferior to unstabilized polyethylene fibers.

Polypropylene can be stabilized against thermally induced degradation with a great variety of phenolic resins, among which are the uniquely effective p-tertiary alkylphenol-formaldehyde resins. The so stabilized polypropylene compositions are more resistant to air oxidation and thermal degradation during compounding and are able to endure the forming temperatures with no significant reduction of strength or electrical properties. However, relatively large concentrations, i.e., 0.1 to 1 percent, are needed to provide the degree of stabilization generally required especially for fiber applications. Unfortunately, the phenolic resins impart a brownish-yellow color to the polypropylene. The higher the concentration of the phenolic resin the greater is the discoloration.

It is therefore the general object of the present invention to provide propylene resin compositions containing phenolic resin stabilizers which are even more stable toward light and thermal degradation than heretofore known and in addition are much improved with respect to color.

This general object as well as others which will be obvious from the specification and the appended claims is achieved by the compositions of the present invention which comprise a normally solid polymer of propylene, a para-tert-alkylphenol-formaldehyde resin, and a polyepoxide containing an average of more than one oxirane ring

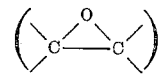

per molecule.

The low molecular weight para-tertiaryalkylphenol-formaldehyde resins suitable for use in this invention are the A-stage resins produced by the reaction of para-tertiaryalkyl-phenols with formaldehyde in the presence of a catalyst. The A-stage of a phenol-formaldehyde resin is the early stage in the production of those thermosetting resins in which the product produced is still soluble in certain liquids and fusible. This stage in the production of thermosetting resins is distinguished from the B-stage and C-stage. The B-stage is an intermediate stage in the reaction of a thermosetting resin in which the product softens when heated and swells when in contact with certain liquids, but does not entirely fuse or dissolve. The C-stage is the final stage in the reactions of a thermosetting resin in which the material is relatively insoluble and infusible. Thermosetting resins in a fully cured state are in this stage.

The A-stage resins used as anti-oxidants in this invention are those produced by the reaction of para-tertiary-alkylphenols with formaldehyde in the presence of a suitable catalyst, such as oxalic acid, by procedures which are well known in the plastics art. Among the para-tertiaryalkylphenols which can be used in producing the suitable A-stage resins by reaction with formaldehyde are the para-tertiaryalkylphenols, in which the alkyl group contains from 4 to about 20 carbon atoms or more, preferably from 4 to about 10 carbon atoms, such as para-tertiarybutylphenol, para-tertiaryamylphenol, para-tertiaryheptylphenol, para-tertiarynonylphenol and the like.

Illustrative of the A-stage resins that can be used to control the oxidative degradation of polypropylene are para-tertiarybutylphenol-formaldehyde resin, para-tertiaryamylphenol-formaldehyde resin, para-tertiarynonylphenol-formaldehyde resin, para-tertiarydodecylphenol-formaldehyde resin and the like. The resins can be prepared from the pure para-phenol or from a mixture of para-phenol with the ortho and/or meta isomers. However, the effectiveness of the A-stage resins as anti-oxidants is dependent in very large measure upon the para-tertiary-alkylphenol content in the resin. Thus, even though an A-stage resin formed from a mixture of isomeric alkylphenols having a major proportion of the para isomer is an effective constituent of the present compositions, larger quantities of the A-stage resin are needed in order to have a sufficient concentration of the para-tertiaryalkylphenol-formaldehyde resin in the polypropylene to give equivalent stabilization to that achieved when a para-tertiarybutylphenol-formaldehyde resin produced from para-tertiarybutylphenol alone is utilized. Also, mixtures of two or more para-tertiaryalkylphenol-formaldehyde resins can be employed.

The organo polyepoxide compounds suitable for use in the compositions of the present invention are those monomeric aliphatic, cycloaliphatic, and aryl substituted aliphatic compounds having about two or more epoxy groups per molecule and wherein oxygen if present other than in oxirane

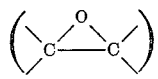

is only in ether

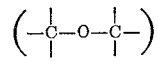

and/or carboxyl

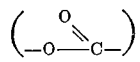

arrangement. Particularly preferred are the diepoxy compounds consisting only of carbon, hydrogen and oxygen, wherein oxygen is present only in oxirane, ether, or ester arrangement, and wherein the epoxy groups are terminal groups of an aliphatic or aryl substituted aliphatic compound, or where the epoxy group or groups include as part of the oxirane structure adjacent carbon atoms of a cycloaliphatic ring.

Specific compounds illustrative of the polyepoxides suitable employed, but in no way limitative thereof, are bis(2,3-epoxypropyl)ether; bis(2,3-epoxy-2-methylpropyl)ether, bis(2,3-epoxybutyl)ether, 1,2-bis(2,3-epoxypropyloxy)ethane, butadiene diepoxide, diglycidyl ether, the diglycidyl ether of 2,2-bis(4-hydroxyphenyl)-propane, 4-vinyl-cyclohexenediepoxide, dicyclopentadiene diepoxide, bis(2,3-epoxycyclopentyl)ether, ethylene glycol bis(3,4-epoxymethylcyclohexanecarboxylate), 3,4-epoxy-6-methylcyclohexylmethyl-3,4-epoxy-6-methylcyclohexanecarboxylate, and epoxidized soy bean oil.

It is to be understood that while the polyepoxide compounds are preferred in which the epoxy group or groups are terminal, aliphatic and substituted aliphatic compounds having adjacent carbon atoms of the epoxy group as adjacent intermediate carbon atoms of a linear chain can be used. Further, mixtures of two or more polyepoxides can be suitably employed, and also mixtures of one or more polyepoxide compounds with one or more monoepoxide monomeric compounds such as 1,2-epoxy octane, 3,4-epoxy heptane, (3-methyl-4,5-epoxycyclohexyl)-methane, and 3,4-epoxycyclopentane. Such mixtures of monoepoxide compounds with polyepoxide compounds must contain an average of at least about 1.5 epoxy groups per mole. By the term "polyepoxide" as used hereinafter in the specification and in the claims is meant therefore a material consisting of either a single epoxide monomer or a mixture of monomers which contain an average of at least about 1.5, and preferably about 2, epoxide groups per molecule. By the term "epoxide group" is meant a

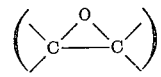

radical in which the oxirane oxygen is attached to adjacent carbon atoms of an aliphatic chain, said aliphatic chain denoting a cycloaliphatic structure as well as an open-chain arrangement.

Propylene resin compositions having vastly improved thermal stability without any significantly greater discoloration over compositions containing only a phenolic resin stabilizer, are according to this invention, those which contain from about 0.05 percent by weight to about 5.0 percent by weight or greater, preferably from about 0.5 to about 2.0 percent by weight, of an A-stage para-tertiary-alkylphenol-formaldehyde resin hereinbefore described based on the weight of the propylene polymer present, and in combination therewith, an epoxy compound as hereinbefore described in an amount of from about 10 to about 600 percent, preferably from about 20 to about 200 percent, by weight based on the weight of the phenolic resin stabilizer present.

Whereas the proportion of A-stage phenolic resin to propylene polymer, and the proportion of the epoxide synergist or promoter to A-stage phenolic resin as set forth above are satisfactory to produce a stable product having a color sufficiently light for all but the most unusual use requirements, it is to be understood that greater or lesser quantities of either the phenolic resin or the epoxide synergist can be utilized without departing from the spirit and proper scope of the present invention. In a practical sense, however, greater latitude can be exercised with respect to the concentration of the phenolic resin than with the dioxaphosphorinane synergist.

The phenolic resin stabilizer and the epoxide synergist can be incorporated into the propylene polymer by any suitable conventional means, as for example, by fluxing the propylene polymer with the stabilizer composition on heated rolls, by the use of Banbury mixers, or of heated extruders, and the like.

The following examples will serve to further illustrate the present invention.

In the examples, at each occurrence the following definitions and characterizations apply:

*Yellowness index.*—The yellowness index reported is the quotient of the degree of yellowness divided by the degree of whiteness of any given polypropylene composition tested. Yellowness and whiteness are based on color reflectance measurements made on molded plaque samples by means of a spectrophotometer modified for reflectance measurements (Beckman model "B" abridged). The reflectance over vitrolite, an arbitrarily chosen reflectance standard, was measured on the plaque samples at wave lengths of 550 m$\mu$ and 430 m$\mu$. Whiteness is based on the percentage reflectance at 550 m$\mu$ and yellowness is based on the percentage reflectance at 430 m$\mu$. The yellowness index is therefore equal to $$\frac{R_{550 \text{ m}\mu} - R_{430 \text{ m}\mu}}{R_{550 \text{ m}\mu}}$$

in which R is the percentage reflectance at the wave length indicated by the subscript. The smaller the quotient, the lighter the color of the composition.

*Polypropylene resin.*—The propylene homopolymer employed is a typical normally solid polypropylene having a melt index of 3.1 decigrams per minute, a density of 0.908 gram per milliliter at 23° C. and a tensile modulus of 138,000 pounds per square inch.

*MIDF (melt index depreciation factor).*—The ratio of melt index of polypropylene resin or resin composition after heating 15 minutes at 288° C. compared to the initial melt index. The melt index determination was in accordance with ASTM test D-1238-52T.

*Thermal stability (induction period in hours in air at 150° C.)*.—As a measure of the thermal stability, the composition tested was compression molded into 30 mil thick plaques which were then suspended in a 150° C. circulating air oven. Periodically the plaques were examined and subjected to a manually applied bending force. The plaques either sustained the applied force without discernible ill effect or crumbled into small powdery fragments. The plaques did not exhibit any in-between behavior. The time period during which the plaque could resist the applied force is called the induction period.

*Phenolic stabilizer*.—(a) p-t-Amylphenol/CH$_2$O resin: An A-stage para-tertiaryamylphenol-formaldehyde resin having a softening point of 185° F. prepared by the oxalic acid catalyzed condensation of para-tertiaryamylphenol and formaldehyde under reflux conditions. The condensation product mass was then vacuum distilled to remove formed water, unreacted phenol, and low molecular weight condensation products, and thereafter cooled and ground; (b) p-t-butylphenol/CH$_2$O resin: An A-stage p-tertiarybutylphenol-formaldehyde resin having a softening point of 266° F. and a specific gravity of 1.04 prepared by the oxalic acid catalyzed condensation of p-tertiarybutylphenol and formaldehyde under reflux conditions.

EXAMPLES 1–7

The synergistic stabilizing action of the polyepoxide synergists with the phenolic resin stabilizers of this invention was demonstrated by preparing a series of polypropylene compositions, some of which contained both a polyepoxide material and a phenolic resin, and some of which contained only a polyepoxide material. The compositions were prepared by admixing the modifiers with the polypropylene immediately after the polypropylene had been fluxed and sheeted on a two-roll mill at 170° C. The modifiers were thoroughly blended with the fluxed polypropylene by successively end-passing the mixture through the mill nip ten times. For control the same polypropylene was hot processed according to the same procedure, one portion receiving no modifiers, and three portions being admixed with the phenolic resin stabilizer in amounts of 0.5 percent, 1.0 percent and 2.0 percent by weight respectively. A portion of all compositions so prepared was compression molded and subjected to testing. The results are reported in Table I below.

*Table I*

| Ex. | Polypropylene Composition | | Yellowness Index | Thermal Stability (induction period at 150° C. in air, hrs.) | MIDF at 288° C. |
|---|---|---|---|---|---|
| | Additives | Conc. of additives [a] | | | |
| Control | None | | 0.39 | 4 | 15 |
| | epoxidized soya bean oil [b] | 0.1 | 0.39 | 4 | 8.2 |
| | do | 0.5 | 0.39 | 4 | 9.0 |
| | p-t-amylphenol/CH$_2$O resin | 0.5 | 0.67 | 32 | 1.4 |
| | do | 1.0 | 0.78 | 48 | 1.3 |
| | do | 2.0 | 0.85 | 100 | 1.5 |
| | p-t-butyl/CH$_2$O resin | 0.5 | 0.67 | 30 | 1.6 |
| | do | 1.0 | 0.78 | 50 | 1.3 |
| | diglycidyl ether of Bisphenol-A [c] | 0.5 | 0.39 | 4 | 11 |
| | Ep-201 [d] | 0.5 | 0.39 | 4 | 13 |
| 1 | p-t-amylphenol/CH$_2$O resin + epoxidized soya bean oil [b] | 0.5 / 0.1 | 0.53 | 50 | 1.0 |
| 2 | p-t-amylphenol/CH$_2$O resin + epoxidized soya bean oil [b] | 0.5 / 0.5 | 0.47 | 70 | 1.3 |
| 3 | p-t-butylphenol/CH$_2$O resin + bis(2,3-epoxy-2-methylpropyl)ether | 0.5 / 0.5 | 0.42 | 64 | 1.1 |
| 4 | p-t-amylphenol/CH$_2$O resin + Ep-201 [d] | 0.5 / 0.5 | 0.50 | 66 | 1.0 |
| 5 | p-t-amylphenol/CH$_2$O resin + bis(2,3-epoxy-2-methylpropyl)ether | 0.5 / 0.5 | 0.47 | 68 | 3.0 |
| 6 | p-t-amylphenol/CH$_2$O resin + diglycidyl ether of Bisphenol-A [c] | 0.5 / 0.5 | 0.47 | 58 | 2.7 |
| 7 | p-t-butylphenol/CH$_2$O resin + epoxidized soya bean oil [b] | 0.5 / 0.5 | 0.47 | 64 | 1.5 |

[a] Percent by weight based on the weight of polypropylene.
[b] Epoxidized mixture of vegetable fatty acids having an epoxy oxirane content of from 6.9–7.0 percent by weight. Pre-epoxidized mixture contained about 50% linoleic acid, 24% oleic acid, and 5% linolenic acid.
[c] Diglycidyl ether of 2,2(4,4′-dihydroxy-diphenyl)propane.
[d] 3,4-epoxy-6-methylcyclohexylmethyl 3,4-epoxy-6-methyl-6-methylcyclohexanecarboxylate.

It can be seen from the data in Table I that the phenolic resins, when used alone, stabilize polypropylene against air oxidation at 150° C. but cause pronounced yellowing, and that both the stabilizing action and yellowing become greater with increasing phenolic resin concentration. It is also apparent that the polyepoxides, by themselves, have no appreciable effect on the stability of the polypropylene in air at 150° C. or on its color.

However, when the polyepoxide is present conjointly with the phenolic resin, the stabilizing action of said resin is upgraded several fold and the color of the overall composition is reduced, almost to the level of the unmodified polypropylene itself.

The combination of phenolic resin stabilizer and polyepoxide promoter or synergist provides a degree of stability which could not otherwise be attained without causnig the color to become unacceptable for many end uses. For instance, to achieve an induction period of 50 hours with even the best of the phenolic stabilizers, e.g., p-t-amylphenol/CH$_2$O resin, requires about a 1% concentration of said stabilizer; and the yellowness index of the composition is about 0.8. By contrast, similar—and even greater—induction periods can be obtained by using only 0.5 percent phenolic stabilizer in combination with a polyepoxide, in which case the yellowness index is only about 0.5. Therefore, if it is necessary that the yellowness index be kept down to a figure not over 0.5, the longest 150° C. induction period which could be achieved with a phenolic stabilizer alone would be considerably less than 30 hours, as against the 70–100 or more hours provided by the phenolic-polyepoxide combinations of this invention.

The contribution of the polyepoxide is surprising in several respects. As already indicated, it does not, by itself, stabilize polypropylene against embrittlement in air at 150° C.; yet it greatly improves the ability of the phenolic to do so. On the other hand, the polyepoxide does, itself, stabilize polypropylene against degradation at high temperature (288° C.) to some small extent; yet appears to add nothing in this respect to the polypropylene-phenolic system.

EXAMPLE 8

The effects of concentration of additives in the polypropylene composition of this invention were determined by preparing a series of compositions according to the procedure of Examples 1–7 containing various amounts of phenolic resin stabilizer and/or the epoxidized soya bean oil of Example 1, and testing the compositions thus obtained for resistance toward embrittlement in air at 150° C. The formulations and results are set forth in Table II below.

Table II

| Conc. of Additives (wt.%) [a] | | | Ratio B/A | Induction period (hrs.) in air at 150° C. |
|---|---|---|---|---|
| (A) Phenolic resin [b] | (B) Epoxide [c] | Total (A+B) | | |
| 0 | 0 | 0 | --- | 4 |
| 0 | 0.1 | 0.1 | --- | 4 |
| 0 | 0.5 | 0.5 | --- | 4 |
| 0.05 | 0.025 | 0.075 | 0.5 | 11 |
| 0.10 | 0 | 0.10 | 0 | 8 |
| 0.10 | 0.10 | 0.20 | 1 | 20 |
| 0.35 | 0.70 | 1.05 | 2 | 55 |
| 0.5 | 0 | 0.5 | 0 | 32 |
| 0.5 | 0.05 | 0.55 | 0.1 | 45 |
| 0.5 | 0.1 | 0.6 | 0.2 | 50 |
| 0.5 | 0.5 | 1.0 | 1.0 | 70 |
| 1.0 | 0 | 1.0 | 0 | 48 |

[a] Based on the weight of polypropylene.
[b] p-t-Amylphenol/CH$_2$O resin.
[c] Epoxidized soya bean oil containing an epoxy oxirane content of from 6.9 to 7.0 percent by weight.

The contribution of the polyepoxide is surprising in that it does not, by itself, effectively stabilize polypropylene against embrittlement in air at 150° C., but it greatly enhances the ability of the phenolic resin to do so.

The polyepoxide compounds in synergistic combination with the A-stage phenolic resins in accordance with this invention are also effective as stabilizers for copolymers of propylene with other olefinically unsaturated monomers such as ethylene and styrene. The term propylene resin as used herein is, therefore, intended to include such copolymers containing at least 50 percent by weight interpolymerized propylene, preferably about 80 percent by weight, as well as propylene homopolymers.

EXAMPLE 9

A styrene-propylene copolymer having a melt index of about 0.03 and containing an interpolymerized styrene to propylene ratio of 18:82 was blended with 0.5 percent by weight of the para-tertiarybutylphenol-formaldehyde resin of Examples 1–7. A portion of this blend was further blended with 3,4-epoxy-6-methylcyclohexylmethyl 3,4-epoxy-6-methylcyclohexanecarboxylate in an amount of 0.5 percent by weight of the overall composition. Each of the two compositions was compression molded and yellowness index determinations made. The yellowness index of the copolymer composition containing only the phenolic resin stabilizer was found to be 0.47. The yellowness index of the composition containing the epoxide compound was 0.28.

The polypropylene compositions of the present invention find particular utility, because of their resistance to oxidation degradation, as extruded or spun textile fibers and yarns. These compositions find additional utility in the form of films and sheets suitable for packaging, and in the form of a wide variety of extruded and molded articles.

The compositions can also include conventional additives such as colorants, lubricants, slip agents, plasticizers, fillers and the like, and can be admixed with other polymeric materials.

What is claimed is:

1. A propylene resin composition stabilized toward heat and light induced molecular degradation which comprises a normally solid propylene polymer containing at least 50 percent by weight of interpolymerized propylene, a stabilizing amount of an A-stage para-tertiaryalkylphenol-formaldehyde resin in which the alkyl group of the para-tertiaryalkylphenol contains from 4 to 20 carbon atoms, and a monomeric aliphatic polyepoxide containing an average of at least about 1.5 epoxide groups per molecule.

2. A stabilized propylene resin composition comprising a normally solid propylene polymer containing at least 50 percent by weight of interpolymerized propylene, an A-stage para-tertiaryalkylphenol-formaldehyde resin in which the alkyl group of the para-tertiaryalkylphenol contains from 4 to 10 carbon atoms, said A-stage phenolic resin being present in an amount of from about 0.05 to about 5.0 percent by weight based on the weight of the propylene polymer, and a monomeric aliphatic polyepoxide containing an average of at least about 1.5 epoxide groups per molecule, said polyepoxide being present in an amount of from about 10 to about 600 percent by weight based on the weight of the A-stage phenolic resin.

3. The composition of claim 2 wherein the monomeric aliphatic polyepoxide is present in an amount of from about 20 to about 200 percent by weight based on the weight of the A-stage phenolic resin.

4. The composition of claim 2 wherein the polyepoxide is a diepoxide wherein the epoxy groups are terminal groups of an aliphatic compound.

5. The composition of claim 2 wherein the polyepoxide is a diepoxide wherein the adjacent carbon atoms of each of the oxirane structures are members of a cycloaliphatic ring.

6. The composition of claim 2 wherein the polyepoxide compound is free of chemically bound oxygen other than oxygen present in the oxirane, ether and carboxyl arrangement.

7. The composition of claim 2 wherein the propylene polymer is a normally solid propylene homopolymer.

8. The composition of claim 7 wherein the polyepoxide compound is the diglycidyl ether of 2,2-(4,4'-dihydroxydiphenyl)propane.

9. The composition of claim 7 wherein the polyepoxide compound is 3,4-epoxy-6-methylcyclohexylmethyl-3,4-epoxy-6-methylcyclohexanecarboxylate.

10. The composition of claim 7 wherein the polyepoxide compound is bis(2,3-epoxy-2-methylpropyl)ether.

11. The composition of claim 7 wherein the polyepoxide compound is butadiene diepoxide.

12. The composition of claim 7 wherein the polyepoxide compound is 4-vinyl-cyclohexenediepoxide.

References Cited in the file of this patent

UNITED STATES PATENTS

| 2,163,637 | Thomas | June 27, 1939 |
| 2,240,582 | Sparks | May 6, 1941 |
| 2,779,771 | Phillips et al. | Jan. 29, 1957 |
| 2,811,505 | Schulken et al. | Oct. 29, 1957 |
| 2,822,368 | Rowland et al. | Feb. 4, 1958 |
| 2,863,881 | Phillips et al. | Dec. 9, 1958 |
| 2,968,641 | Roberts et al. | Jan. 17, 1961 |
| 2,985,617 | Salyer et al. | May 23, 1961 |
| 3,020,259 | Schulde et al. | Feb. 6, 1962 |

OTHER REFERENCES

Smith: British Plastics, August 1954, pages 307–311.